(12) United States Patent
Beardsley et al.

(10) Patent No.: US 6,839,827 B1
(45) Date of Patent: Jan. 4, 2005

(54) METHOD, SYSTEM, PROGRAM, AND DATA STRUCTURES FOR MAPPING LOGICAL BLOCKS TO PHYSICAL BLOCKS

(75) Inventors: Brent Cameron Beardsley, Tucson, AZ (US); Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/484,574

(22) Filed: Jan. 18, 2000

(51) Int. Cl.$^7$ ............................................... G06F 12/10
(52) U.S. Cl. ...................... 711/206; 711/220; 711/114
(58) Field of Search ........................... 711/4, 114, 202, 711/203, 206, 173

(56) References Cited

U.S. PATENT DOCUMENTS

| | | | |
|---|---|---|---|
| 5,129,088 A | * 7/1992 | Auslander et al. ............. | 711/1 |
| 5,193,184 A | * 3/1993 | Belsan et al. .................. | 711/4 |
| 5,517,632 A | 5/1996 | Matsumoto et al. | |
| 5,561,778 A | * 10/1996 | Fecteau et al. ............. | 711/209 |
| 5,630,093 A | * 5/1997 | Holzhammer et al. ...... | 711/115 |
| 5,708,848 A | * 1/1998 | Sangveraphunsiri et al. .. | 710/21 |
| 5,761,526 A | 6/1998 | Sakakura et al. | |
| 5,897,661 A | * 4/1999 | Baranovsky et al. ........ | 711/170 |

FOREIGN PATENT DOCUMENTS

| | | |
|---|---|---|
| JP | 07-152491 | 6/1995 |
| JP | 09-062452 | 3/1997 |
| JP | 2001-125754 | 5/2001 |

OTHER PUBLICATIONS

AIX Versions 3.2 and 4 Performance Tuning Guide, Fifth Edition Apr. 1996, "Performance Overview of AIX Managment of Fixed–Disk Storage", Part of Chap. 2, [retrieved on Nov. 15, 1999] Retrieved from the Internet: <URL: http://www.austin.ibm.com/doc_link/en_US/a_doc_lib/aixbman/prftungd/fkiskman.htm . . . figures/prftu12.jpg.

AIX Versions 3.2 and 4 Performance Tuning Guide, Fifth Edition Apr. 1996, "Logical Volume Striping ", Part of Chap. 8, [retrieved on Nov. 15, 1999] Retrieved from the Internet: <URL: http://www.austin.ibm.com/doc_link/en_US/a_doc_lib/aixbman/prftungd/edition.htm . . . lvstrip.htm . . . figures/prfftu29.jpg. . . fragsize.htm . . .

"Logical Volume Storage Overview", System Management Concepts: Operating System and Devices, Part of Chap. 6, [retrieved on Nov. 15, 1999]. Retrieved from the Internet: <URL: http://www.austin.ibm.com/doc_link/en_US/a_doc_lib/aixbman/admnconc/lvm_overview.htm.

D. McNutt, "The Logical Volume Manager", Unix Review, vol. 15, No. 3, Mar. 1997, pp. 63–65 (Abstract).

* cited by examiner

Primary Examiner—Matthew D. Anderson
(74) Attorney, Agent, or Firm—David W. Victor; Konrad Raynes & Victor LLP

(57) ABSTRACT

Disclosed is a method, system, program, and data structure for a storage controller to map logical blocks to physical storage blocks. The storage controller is in communication with at least one host system that views a logical storage space. The storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, the contiguous logical chunks are capable of being associated with non-contiguous physical chunks.

43 Claims, 6 Drawing Sheets

| Array ID | Chunk No. | Allocated (Y/N) | Logical Volume | Logical Chunk Number |
|---|---|---|---|---|
| FFF0H | 1 | Y | 3 | 21 |
| FFF0H | 2 | Y | 5 | 2 |
| FFF0H | 3 | N | --- | --- |
| . . . | . . . | . . . . . | . . . | . . . . . |
| . . . | . . . | . . . . . | . . . | . . . . . |
| FFF0H | k | N | --- | --- |

FIG. 2

| Chunk No. | Array ID | Physical Chunk Number |
|---|---|---|
| 1 | FFF0H | 10 |
| 2 | 000FF | 2 |
| 3 | FFF0H | --- |
| . . . | . . . | . . . . . |
| . . . | . . . | . . . . . |
| 32 | FFF0H | --- |

FIG. 3

METHOD, SYSTEM, PROGRAM, AND DATA STRUCTURES FOR MAPPING LOGICAL BLOCKS TO PHYSICAL BLOCKS

BACKGROUND OF THE INVENTION

1. Field of the Invention

The present invention relates to a system, method, program, and data structures for mapping logical blocks to physical blocks by defining logical chunks and physical chunks in the logical and physical storage spaces, respectively.

2. Description of the Related Art

An operating system arranges the storage space of a storage system into logical volumes. A hierarchy of structures is used to manage fixed-disk storage. In large mainframe systems, such as the International Business Machines Corporation (IBM) AIX ad, or OS/390 operating systems, each individual fixed-disk drive is referred to as a physical volume (PV). Every physical volume in use belongs to a volume group (VG). All of the physical volumes in a volume group may be divided into physical partitions (PPs) of the same size. Within each volume group, one or more logical volumes (LVs) are defined. Logical volumes are groups of information located on physical volumes. Data on logical volumes appears to be contiguous to the user but can be discontiguous on the physical volume. This allows file systems, paging space, and other logical volumes to be resized or relocated, span multiple physical volumes, and have their contents replicated for greater flexibility and availability in the storage of data. The logical volume is the host system view of the storage space and defines allocation of disk space down to the physical-partition level.

The set of operating system commands, library subroutines, and other tools that allow system administrators to establish and control logical volume storage is sometimes refereed to as a Logical Volume Manager (LVM). The Logical Volume Manager (LVM) controls disk resources by providing the mapping of data between a more simple and flexible logical view of storage space and the actual physical disks. The Logical Volume Manager (LVM) consists of the logical volume device driver (LVDD) and the LVM subroutine interface library. The logical volume device driver (LVDD) is a pseudo-device driver that manages and processes all I/O. It translates logical addresses into physical addresses and sends I/O requests to specific device drivers. The LVM subroutine interface library contains routines that are used by the system management commands to perform system management tasks for the logical and physical volumes of a system.

The host views the storage device as Logical Unit Numbers or LUNs. A storage controller defines a mapping from the LUN space to physical storage. In the prior art, the Logical Volume Manager is capable of subdividing the LUN into logical chunks and then associating contiguous or noncontiguous logical chunks in the LUN storage space with logical volumes. In this way, the Logical Volume Manager may expand the size of a logical volume by assigning an additional logical chunk to the logical volume. One drawback of this approach is that the Logical Volume Managers on different host systems must coordinate their activity to ensure that they all maintain the same assignment of logical chunks of the LUN to the logical volumes.

Data in a logical volume may be stored in an array of disk drives referred to as a Redundant Array of Independent Disks (RAID). A RAID array of disks are managed by a RAID controller as a single physical volume. The RAID controller writes data from a logical volume across multiple disk drives. In a RAID 5 geometry, one of the disk drives is used to maintain parity information so that if one disk drive fails, the data can be reconstructed from the parity information and data on the surviving disk drives. In RAID implementations, data from a logical volume is striped or written across several disk drives in such a way that the I/O capacity of the disk drives can be used in parallel to access data on the logical volume. Data from a logical volume is written (striped) across consecutive blocks on the disks. A complete stripe consists of one stripe unit on each of the physical devices that contains part of the striped logical volume. The Logical Volume Manager determines which physical blocks on which physical drives correspond to a block being read or written. If more than one drive is involved, the necessary I/O operations are scheduled for all drives simultaneously.

In prior art systems, a volume may be deleted from a storage system. To reuse the data in the storage system, the systems administrator would have to allocate the physical space previously used for the deleted volume to another volume that is capable of fitting into the space. Thus, the systems administrator is limited to the size of the freed-up space in attempting to reuse that space for another logical volume. Further, in prior host systems that do not include the Logical Volume Manager, there is no way to dynamically increase the size of a volume that is currently in use. In current art, to add space when there is no Logical Volume Manager, a new logical volume must be added to the system. Still further, in the current art, a logical volume does not span multiple RAID arrays.

Thus, there is a need in the art for an improved method, system, program, and data structures for allocating physical storage space to logical volumes.

SUMMARY OF THE PREFERRED EMBODIMENTS

To overcome the limitations in the prior art described above, preferred embodiments disclose a method, system, program, and data structure for a storage controller to map logical blocks to physical storage blocks. The storage controller is in communication with at least one host system that views a logical storage space. The storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, the contiguous logical chunks are capable of being associated with non-contiguous physical chunks.

In further embodiments, a determination is made of a number of logical chunks to add to the logical storage space to expand storage in the logical storage space. A determination is further made of one physical chunk not associated with a logical chunk in the physical storage space for each determined logical chunks to add. Each determined physical chunk is associated with each determined logical chunk to add to the logical storage space.

In still further embodiments, the logical storage space comprises a logical volume and the physical storage system comprises multiple storage devices. Further, the physical chunks associated with at least two consecutive logical chunks are capable of being located in separate storage devices.

Yet further, each of the multiple storage devices may comprise a RAID array and at least two logical chunks in the physical volume are capable of being located in separate RAID arrays.

Preferred embodiments provide a method, system, program, and data structures for defining logical and physical storage as groups of chunks in a manner such that physical chunks at non-contiguous storage locations may be associated with contiguous logical chunks. In this way, the size of the logical volume can be expanded by associating further physical chunks, without regard to where those physical chunks are located in storage, with logical chunks contiguous to the current set of logical chunks defining the logical volume. By defining a storage system including multiple storage devices into physical chunks physical chunks from different storage devices and raid arrays, contiguous and non-contiguous chunks in the same logical volume may be associated with physical chunks in different RAID arrays. This allows for dynamic management of space allocated to logical volumes.

Further, by having the storage controller perform the logical to physical mapping, the storage controller may map logical storage space to non-contiguous physical storage blocks for host systems that do not include a logical volume manager that could otherwise define the logical space as logical chunks. Further, by having the storage controller manage the mapping, conflicts resulting from multiple hosts performing the mapping are avoided.

BRIEF DESCRIPTION OF THE DRAWINGS

Referring now to the drawings in which like reference numbers represent corresponding parts throughout:

FIG. 2 illustrates an Array Control Table used to allocate logical volume blocks to chunks in the physical storage space in accordance with preferred embodiments of the present invention;

FIG. 3 illustrates a Volume Control Table used to allocate logical volume blocks to chunks in the physical storage space in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
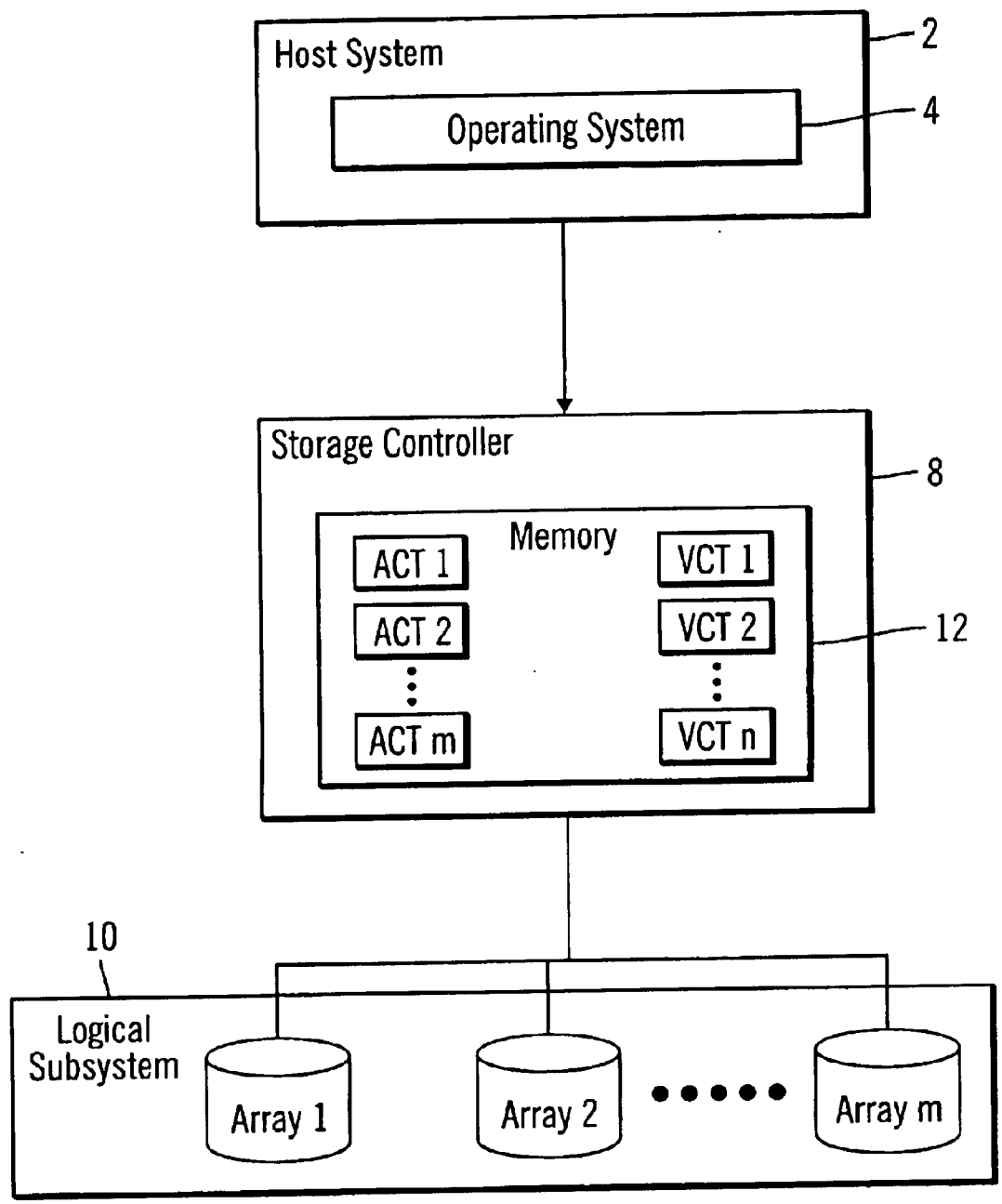
FIG. 1 is a block diagram illustrating a computing environment in which preferred embodiments are implemented.

FIG. 1 illustrates a computing environment in which preferred embodiments are implemented. A computer system 2 includes an operating system 4. In preferred embodiments, the computer system 2 comprises a server type system receiving input/output (I/O) requests from multiple client systems. The computer system 2 may comprise any type of computer system known in the art, such as a mainframe, personal computer, storage controller (e.g., the IBM 3990 Storage controller, the IBM Enterprise Storage Server), etc. The operating system 4 may include an operating system capable of managing I/O requests from client computers such as AIX, OS/390, MVS, Windows NT, etc.**

In preferred embodiments, the operating system 4 views the storage system as logical volumes, such as LBA addresses. The operating system 4 communicates I/O requests to a storage controller 8 which manages access to multiple RAID Arrays 1, 2, . . . m. Each of the m RAID Arrays comprises a package of multiple hard disk drives. For instance, each array may comprise a tower capable of housing numerous hard disk drives, such as the IBM 7131 SSA Multi-Storage Tower Model 405, which can provide up to 45.5 gigabyte (GB) of storage per tower, or the IBM 7133 SSA Disk Subsystem which can provide up to 145 GB in a single deskside or rack-mountable enclosure. The combination of the Arrays 1, 2, . . . , m form logical subsystem 10. Each Array 1, 2, . . . , m forms a physical volume made up of physically contiguous blocks of data, presently 512 bytes. The storage controller 8 stripes data across the hard disk drives of the Arrays 1, 2, . . . , m using a RAID geometry, such as RAID 5, in a manner known in the art. The Storage controller 8 may comprise any RAID adaptor known in the art, such as the IBM SerialRAID Adaptor.

**Windows and NT are registered trademarks of Microsoft Corporation; AIX and OS/390 are registered trademarks of IBM and MVS is a trademark of IBM.

Figure 2:
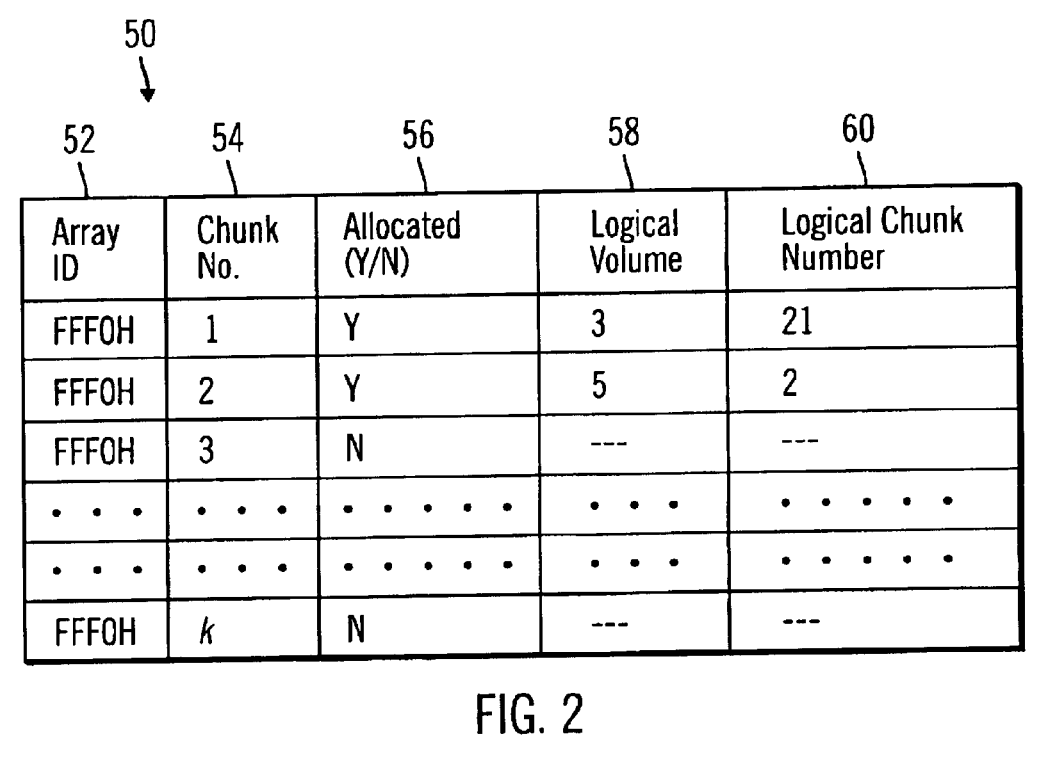

Preferred embodiments provide a technique for allocating data to logical volumes in allocatable units referred to herein as "chunks." Each chunk represents contiguous blocks of physical storage in the arrays and logical blocks in the logical volume. Preferably, the total blocks in the physical volume is a multiple of the chunk block size. In this way, the physical storage of each array 1, 2, . . . m is defined as a multiple of uniquely identifiable chunks. In preferred embodiments, the chunk size remains fixed throughout all the arrays 1, 2, . . . m. The storage controller 8 maintains two types of tables in memory 12, an Array Control Table (ACT) and Volume Control Table (VCT). The memory 12 may comprise volatile memory or a combination of volatile and non-volatile memory, such as disk storage, where data is swapped therebetween. The storage controller 8 maintains an Array Control Table (ACT) for each of the m Arrays available in the storage system and a Volume Control Table (VCT) for each of the n logical volumes in the system FIG. 2 illustrates an example of an Array Control Table (ACT) 50. The Array Control Table includes the following fields:

Array ID 52: provides a unique identifier of the Array 1, 2, . . . or m for which the table 50 is maintained;

chunk number 54: The array storage space may be defined as a sequence of contiguous physical chunks, wherein each physical chunk defines contiguous blocks of physical storage. The chunk number would identify a particular chunk within the array identified in the Array ID 52 field. The chunk defining blocks in the physical storage is referred to herein as a "physical chunk."

Allocated Flag 56: Boolean value indicating whether the physical chunk for the entry is allocated to a logical volume.

Logical Volume 58: indicates a number or identifier of the logical volume 58 to which the physical chunk is allocated.

Logical Chunk Number 60: Each logical volume may be defined as a sequence of contiguous logical chunks numbered in sequence. The logical chunk number in the logical volume 60 identifies the location of a logical chunk in the sequence of logical chunks defining the logical volume corresponding to the physical chunk entry in the Array Control Table.

Initially, the Array Control Table 50 includes a row for each physical chunk in the array and the Allocated field 56 set to "N". To determine the number of rows in an Array Control Table, the size of the array in blocks would be divided by the physical chunk size or blocks per chunk. In preferred embodiments, a physical chunk size is selected such that each array size in the logical subsystem 10 is a multiple of the physical chunk size. As logical chunks are allocated to logical volumes, the Array Control Table 50 is updated to reflect the corresponding allocation of the physical chunk to the logical chunk.

Thus, each row in the Array Control Table includes information for each physical chunk in an array and information on the location of the corresponding logical chunk in the logical volume.

The storage controller 8 further maintains Volume Control Tables (VCT) 1, 2, . . . , n for each logical volume in the storage system. FIG. 3 illustrates the fields in a Volume Control Table 80:

Chunk Number 82: indicates a consecutive number of each possible logical chunk number in the logical volume. The size of the logical volume may be limited to a predetermined number of logical chunks. The logical volume is comprised of a series of Logical Block Addresses (LBAs). If a logical volume can have up to 32 logical chunks but is in fact comprised of less than 32 chunks, then only those rows in the table for the logical chunks defining the storage space for the logical volume have valid data. In this way, the consecutive LBAs of a logical volume are divided into sequential logical chunks indicated in the Volume Control Table. Thus, the chunk number identifies the relative location of a logical chunk with respect to the other logical chunks that define the logical volume.

Array ID 84: For each chunk in the logical volume, this field 84 indicates the array including the physical chunk allocated to the logical chunk identified by the chunk number 82.

Physical Chunk Number 86: Indicates the sequential physical chunk number in the array having the array ID that stores the physical data for the logical chunk identified in the chunk number field 82.

Thus, the Array Chunk Table and Volume Control Tables are interrelated in that a the Array Chunk Table informs the storage controller 8 of the volumes to which each physical chunk in the array is allocated and the logical chunk location within the volume and the Volume Control Table informs the storage controller 8 of the array and sequential physical chunk position within the array to which each logical chunk in the logical volume is allocated. In preferred embodiments, the logical and physical chunks each comprise the same number of bytes even though the LBA included in a logical chunk may be different from the physical blocks included in a physical chunk.

Figure 4:
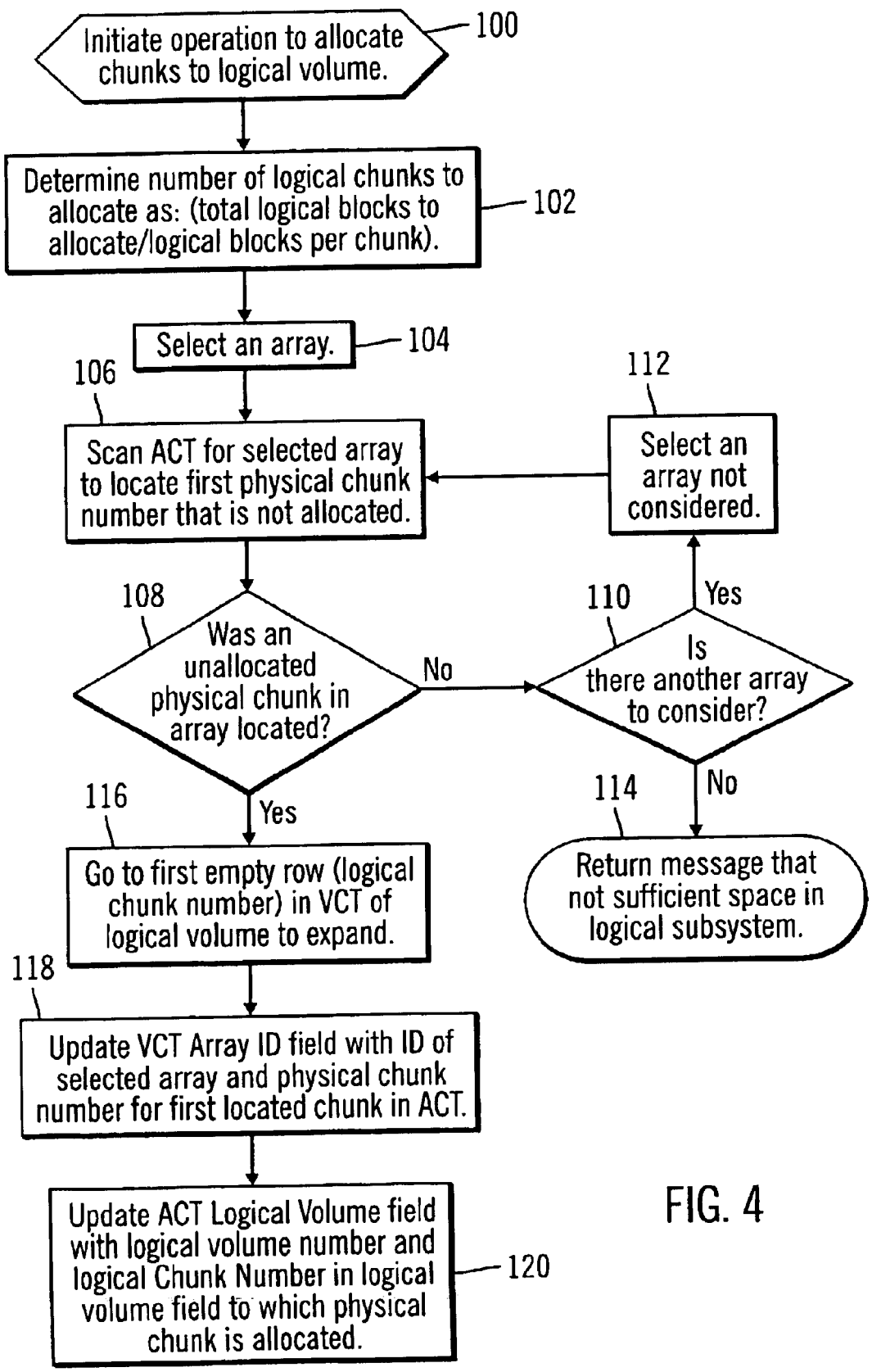
FIG. 4 illustrates logic to allocate chunks to a logical volume in accordance with preferred embodiments of the present invention.

FIG. 4 illustrates logic implemented in the storage controller 8 to allocate chunks in the logical subsystem 10 to logical volumes when expanding the number of blocks in a logical volume or initially building the logical volume. Control begins at block 100 with the storage controller 8 initiating an operation to allocate logical and physical chunks to a logical volume. The storage controller 8 would initiate this operation at block 100 in response to a command from the host system 2 to create a logical volume that specifies the number of logical blocks, e.g., LBA addresses to include in the logical volume. For instance, the host system 2 maps its file system to logical blocks, map to logical chunk numbers, that in turn map to physical chunks and physical addresses. In this way, the storage controller may work with different operating system platforms because the storage controller 8 only deals with logical blocks, and does not concern itself with how the host system 2 manages and uses those logical blocks. This lets the storage controller use the chunk mapping with different host systems.

The storage controller 8 determines (at block 102) the number of logical chunks to allocate, which would be equal to the total logical blocks to allocate divided by the number of logical blocks per chunk. At this point, the storage controller 8 would also check whether the Volume Control Table (VCT) includes sufficient entries to allocate all the blocks the user wants to add to the volume. For instance, if the allocation were to require more than 32 entries, the example given above of the number of entries of space for each logical volume, then the storage controller 8 would not perform the allocation. In other words, the user cannot allocate to a volume more than the total number of blocks that may be included in a volume. In preferred embodiments, the file or directories contents are divided into logical blocks that are mapped to a particular logical chunk number, which in turn maps to a particular array and physical chunk number within the array. The storage controller 8 then selects (at block 104) one of the Arrays 1, 2, . . . , m in the logical subsystem 10 to consider and scans (at block 106) the Array Control Table (ACT) for the selected array to locate the first physical chunk number entry that is not allocated to a logical volume, i.e., the first entry where the Allocated field 56 is "N". If (at block 108) an unallocated physical chunk in the Array Control Table was not located, then the storage controller 8 determines (at block 110) whether there are arrays in the logical subsystem 10 that have not yet been considered. If not, then the storage controller 8 returns a message (at block 114) that there is insufficient space in the logical subsystem 10 for further allocation of chunks to the logical volume. Otherwise, the storage controller 8 selects (at block 112) an array not yet considered and returns to block 106 to locate the first unallocated physical chunk in that array.

Upon locating an unallocated physical chunk, the storage controller 8 accesses (at block 116) the first empty row in the Volume Control Table (VCT) for the logical volume. As discussed, the Volume Control Table may maintain 32 entries for the sequential logical chunks that form the logical volume. If all the possible logical chunk entries in the Volume Control Table have been filled, then the logical volume cannot be expanded further. Upon accessing the first entry in the Volume Control Table for an unallocated logical chunk, the storage controller 8 updates (at block 118) the Array ID field 84 with the ID of the selected array and the Physical Chunk Number field 86 with the physical chunk number indicated in the chunk number field 54 of the first located entry of the Array Control Table (ACT). The storage controller 8 then updates the Array Control Table (ACT) Logical Volume field 58 and the Logical Chunk Number 60 to which the physical chunk is allocated. The logical chunk number in field 60 is determined from the Chunk Number field 82 for the entry in the Volume Control Table (VCT) to which the physical chunk is allocated.

Figure 5:
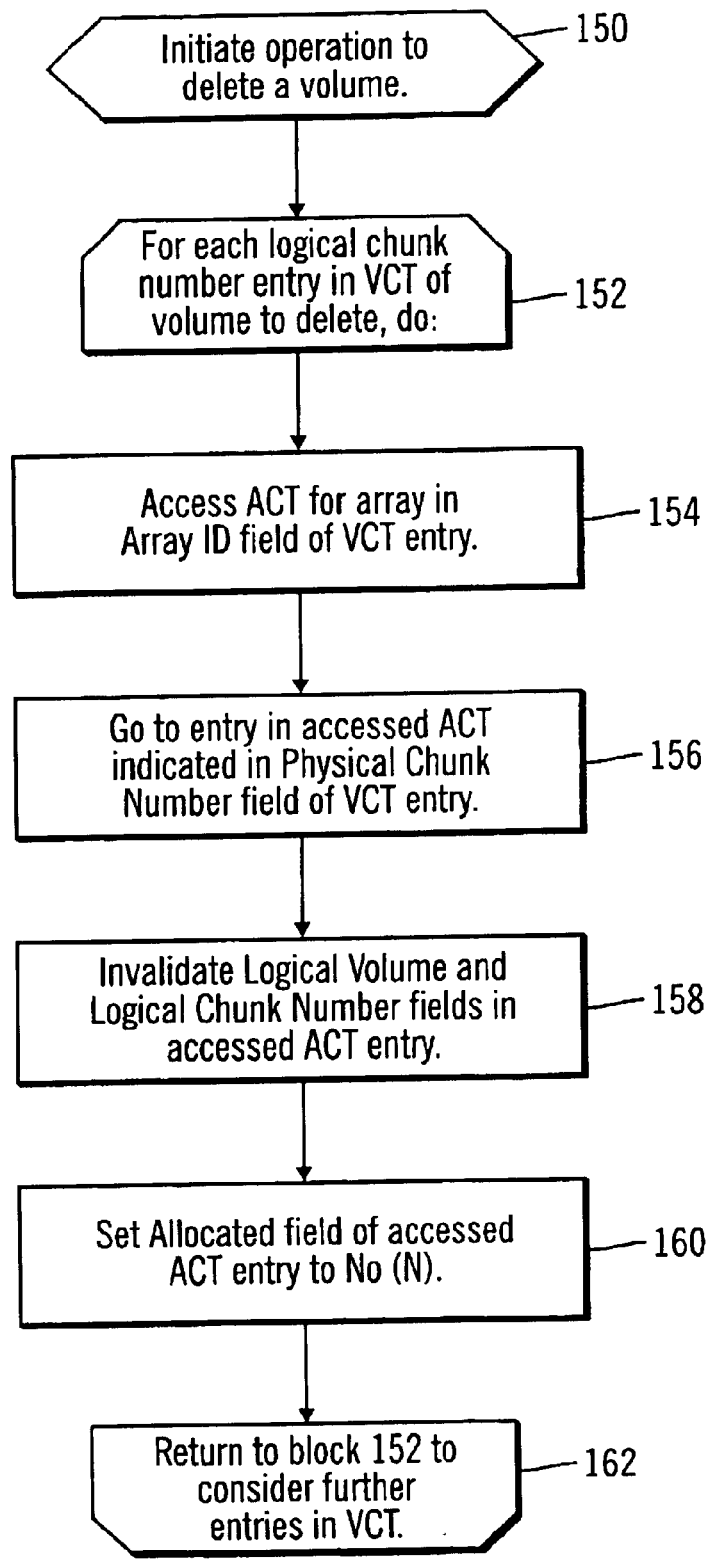
FIG. 5 illustrates logic to delete a logical volume in accordance with preferred embodiments of the present invention.

FIG. 5 illustrates logic implemented in the storage controller 8 to delete a logical volume and free the logical and physical blocks allocated to the deleted logical volume in response to a command to delete a logical volume from the host system 2. Control begins at block 150 with the storage controller 8 initiating an operation to delete a logical volume. The storage controller 8 begins a loop (at block 152). For each chunk number in the Volume Control Table (VCT) including allocated chunks, the storage controller 8 accesses (at block 154) the Array Control Table (ACT) for the array indicated in the Array ID field 84 for the current entry being considered in the Volume Control Table (VCT). The storage controller 8 then accesses (at block 156) the entry in the Array Control Table (ACT) having the number indicated in the Physical Chunk Number Field 86 at the currently entry being considered in the Volume Control Table (VCT). The storage controller 8 invalidates (at block 158) the values in the Logical Volume 58 and Physical Chunk Number 60 Fields in the accessed entry in the Array Control Table (ACT). The Allocated Field 56 in the Array Control Table (ACT) for the accessed entry is set (at block 160) to N. At block 162, the storage controller 8 returns to block 152 to consider any further entries in the Volume Control Table (VCT).

Figure 6:
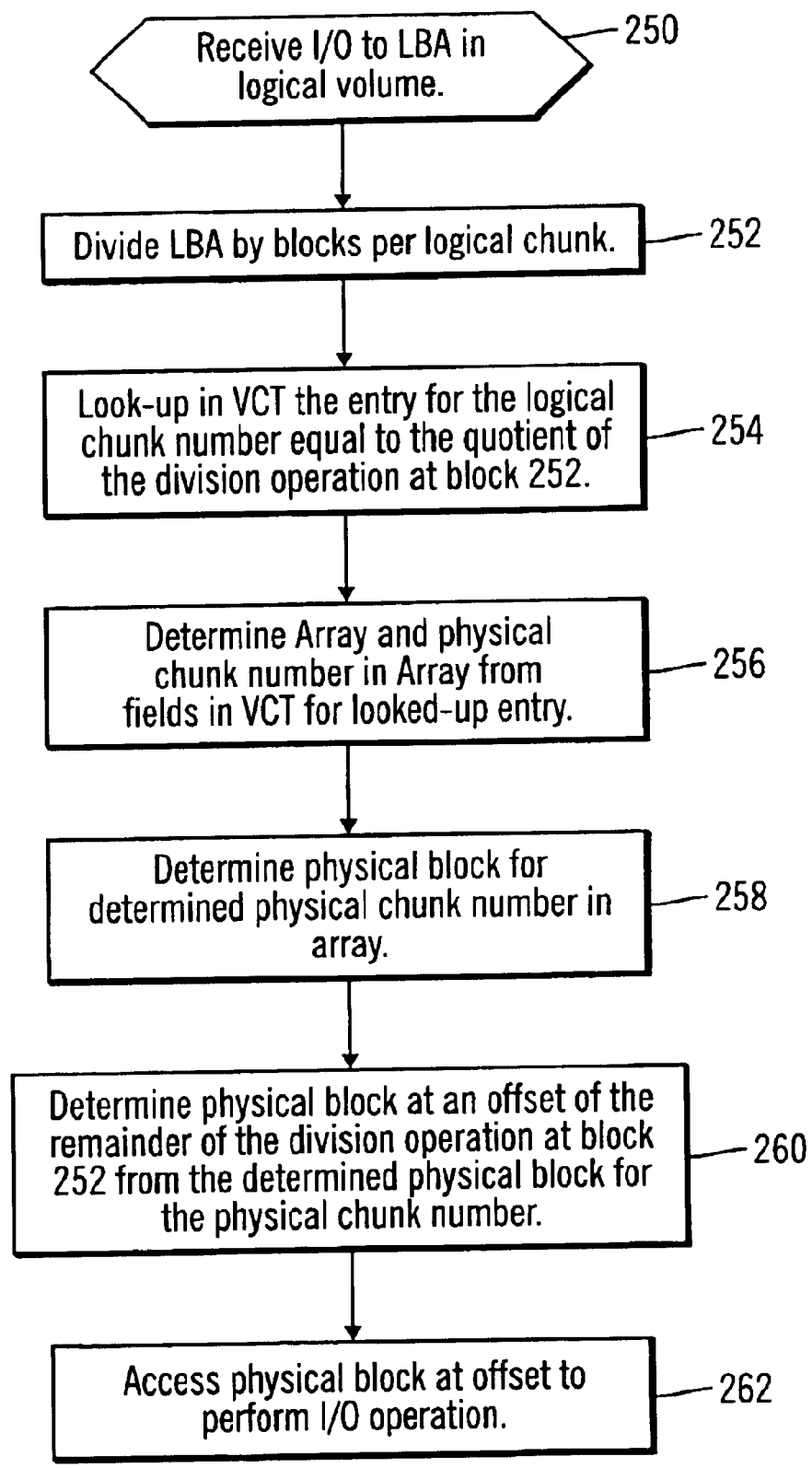
FIG. 6 illustrates logic to map a Logical Block Address (LBA) to a physical storage block during an I/O operation in accordance with preferred embodiments of the present invention.

FIG. 6 illustrates logic implemented in the storage controller 8 to determine the physical block subject to a received Input/Output (I/O) request. Control begins at block 250 with the storage controller 8 receiving an I/O request from the host system 2 directed toward a LBA in a logical volume. The LBA indicates a logical block number to which the I/O request is directed. The storage controller 8 divides (at block 252) the received LBA address by the number of logical blocks per chunk. The storage controller 8 looks-up (at block 254) in the Volume Control Table (VCT) the entry for the chunk number equal to the quotient of the division operation at block 252. For instance, if the LBA is 153 and the chunk size is 16 blocks, then the LBA is located in the $9^{th}$ chunk (153/16) of the logical volume, which is then mapped to a physical chunk in an array. The storage controller 8 then determines (at block 256) the Array and physical chunk number in the array corresponding to the LBA from the Array 84 and Physical Chunk Number 86 fields in the Volume Control Table (VCT) for the logical volume including the received LBA. The determined physical chunk number in the array is then mapped (at block 258) to a physical block in the array as the remainder defines an offset into the blocks of the array. The storage controller 8 then determines (at block 260) the physical block at an offset of the remainder of the division operation at block 252 from the physical block corresponding to the determined physical chunk number. For instance, if there are 16 physical blocks per chunk and the LBA maps to chunk 10 in the array, then the block subject to the I/O operation is 9 blocks (the remainder of 153/16) into the $10^{th}$ chunk, or 9 blocks from the $160^{th}$ block, which is the $169^{th}$ physical block in the array. The storage controller 8 may then access (at block 262) the located physical block to perform the requested I/O operation.

The preferred embodiments map an LBA to a logical chunk in the Volume Control Table then to a physical chunk in the physical array and then to a physical block in a storage array. This additional layer of chunk mapping provides a reusable and allocatable unit of storage, i.e., the "chunk", that can be used to expand and define a logical volume in a manner that maximizes the use of available space in the logical subsystem 10. Preferred embodiments provide a system, method, and program for providing a definition of storage space that may be readily allocatable to logical volumes to expand or dynamically alter the size of a logical volume.

When expanding a logical volume by allocating more chunks to the logical volume, there may be two users accessing the logical volume, I/O requests from a client and the storage controller 8 updating control data structures in the operating system 2 to reflect the new chunks being allocated to the logical volume. To allow I/O requests continued access to the logical volume while the storage controller 8 is updating control data structures, preferred embodiments continue to provide I/O requests access to the old Volume Control Table, thereby limiting to I/O requests access to those chunks and LBAs in existence prior to the operation to expand the logical volume. In the meantime, the storage controller 8 will generate a new Volume Control Table and update appropriate storage controller 8 structures to reflect the new chunks and LBAs added to the logical volume. For instance, if the storage controller 8 is emulating different disk drive types, the disk drive types being emulated may utilize specific control data structures. As the logical volume grows, the storage controller 8 will have to update the emulated drive specific data structures to reflect the altered size of the logical volume. For instance, when allocating chunks to a Count-Key-Data (CKD) formatted drive, the data blocks would be initialized to indicated CKD tracks with no records. On the other hand, for LBA formatted drives, various check bytes would have to be updated.

After updating all the appropriate control data structures and creating the new Volume Control Table, the storage controller 8 would make the new Volume Control Table the table all volume users would access. In this way, I/O requests can continue to access the logical volume while the storage controller 8 completes low level formatting.

To select the appropriate chunk size, certain factors should be considered. First, a chunk size should be selected to function optimally with the different RAID geometries of the Arrays 1, 2, . . . , m in the logical subsystem 10, if the arrays have different RAID geometries. Preferably a chunk size is selected that is a multiple of the stripe boundaries.

In this way, each stripe boundary of every Array 1, 2, . . . , m is a multiple of the chunk size In RAID systems, I/O operations are optimized if data is striped across all disks in the array storing data. For instance, in RAID 5, for each stripe, one drive stores the parity for the stripe and the others store the data. Typically, 128 sectors are written to each drive. If there is a 6+P geometry, data is written to six disks or 6×128=768 sectors, in a 7+P geometry data is written to seven disks, having 896 sectors. Thus, in preferred embodiments, a chunk size is selected that is the least common multiple, in physical blocks, of the stripe size across all array boundaries. This allows a chunk size to comprise an integer multiple of stripes. Assuming a stripe size of 128 and array sizes geometries of 6+P and 7+P, then the least common multiple would be 6*7*128=5376, providing a chunk size of 5376. The reason to select a chunk size to comprise physical blocks that can fit into an entire stripe boundary is that it is optimal to write to every drive in the array. If data is striped across all drives or arrays, then the parity can be calculated from the write data to all disks directly. If data is written to less than all the disks, then data in the strip for the disks not written to must be read to calculate the parity, which requires additional I/Os and the associated delays. For this reason, it is preferable to select a chunk size that is the greatest common denominator across all RAID geometries to ensure that chunks can completely fill an entire stripe boundary. If the stripe boundary is not a multiple of the chunk size, then only a portion of the last chunk is used to fill the stripe boundary, resulting in a waste of the remainder of the space in the chunk.

Another factor to consider when selecting a chunk size is the disk drive in the array or that the array is emulating. For instance, different systems support different logical volume sizes. Thus, it is preferable to have a logical volume size that is a multiple of the chunk size. Further, it is desirable that the array size is divisible by the chunk size, such that the chunk cannot exceed the storage space of a drive or array, i.e., a chunk cannot span a drive. This ensures that all of the chunk space is used.

In trying to comply with all the above factors, i.e., selecting a chunk size that is a least common multiple of the stripe boundary across arrays, the logical volume sizes supported in the system, and the disk drive storage space, a relatively small chunk size may be selected. Selecting a smaller chunk size degrades system performance because the Volume Control and Array Control Tables maintained in memory are increased to include more chunk entries. Further, it requires more processor cycles to process and manage these larger tables. For this reason, a larger chunk size may be selected to limit the table size and number of entries in the table. However, this goal must be balanced against the need to provide a small enough chunk size to comprise a multiple of all the arrays.

Consideration of the performance and memory usage factors may require that a chunk size is selected that does not comply with all the other discussed factors, such as RAID geometry, logical volume sizes, disk size, etc. Further, in practice all these conditions cannot be met simultaneous and the chunk size may be selected to minimize wasted space. Thus, the condition of maintaining the chunks size as a multiple of the stripe size may be selected above other factors, such as the drive type being emulated may be considered.

Thus, tests may be performed to select a chunk size that does not degrade memory and system performance and at the same time is able to or comes as close as possible to satisfying as many boundaries as possible.

Preferred embodiments have the storage controller handle the logical to physical mapping. This is advantageous as the storage controller may provide such mapping to allow the storage controller to expand and reduce a logical volume for those host systems that do not include a logical volume manager. Moreover, with preferred embodiments, the storage controller may coordinate a logical to physical mapping for multiple host systems, thereby avoiding the need to coordinate the mappings between hosts as the mapping is managed by the storage controller which manages access to the storage devices for all hosts.

CONCLUSION

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

In preferred embodiments, the logic and tables used to perform the logical to physical chunk mapping was performed in a storage controller. In this way, the mapping may be determined across host operating system types as the storage controller is only concerned with the logical block addressing and not how those logical blocks are allocated in the host. In alternative embodiments, the logic and tables of the preferred embodiments may be implemented in the host system.

The preferred logic of FIGS. 4–6 described specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

Preferred embodiments of the logic to map logical blocks to chunks and then to physical blocks in the storage array were described as implemented in the storage controller 8. In further embodiments, this logic may be implemented in alternative components of the operating system or within an application program.

Preferred embodiments were described as implemented in a logical subsystem including RAID arrays. However, in alternative embodiments, the arrays may comprise storage devices or separate Direct Access Storage Devices (DASD) unit, which is a unit including interconnected hard disk drives, that do not use the RAID geometry to store data. In such case, the array ID would comprise the identifier of the DASD. In still further embodiments, the arrays may be substituted for single hard disk drives storing data in a non-RAID format, where the array ID would just be an identifier of the hard drive. Alternatively, the logical subsystem may comprise a single DASD unit or single hard disk drive. In such case, it may not be necessary to maintain a separate ID for the device.

Preferred embodiments were described as defining a logical volume into logical chunks. In further embodiments, different storage spaces may be subject to a logical chunk division other than a volume, e.g., a partition, etc.

Preferred embodiments described information fields in separate tables, the Volume Control Table and Array Control Table. In alternative embodiments, the information in these tables may be included in a single table or in three or more tables. Moreover, information may be added or varied in the tables.

In summary, preferred embodiments disclose a method, system, program, and data structure for a storage controller to map logical blocks to physical storage blocks. The storage controller is in communication with at least one host system that views a logical storage space. The storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, the contiguous logical chunks are capable of being associated with non-contiguous physical chunks.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mapping logical blocks to physical storage blocks in a storage controller in communication with at least one host system that views a logical storage space, comprising:

defining, with the storage controller, the logical storage space as a sequence of logical chunks, wherein each logical chunk comprises a plurality of logical blocks in the logical storage space;

defining with the storage controller, a physical storage space as a sequence of physical chunks managed by the storage controller, wherein each physical chunk comprises a plurality of physical storage blocks in the physical storage system;

associating, with the storage controller, each logical chunk in the sequence of logical chunks defining the logical storage space in the at least one host system with one physical chunk in the physical storage system, wherein continuous logical chunks are capable of being associated with non-contiguous physical chunks;

determining a number of logical chunks to add to the logical storage space to expand storage in the logical storage space;

determining one physical chunk not associated with a logical chunk in the physical storage space for each determined logical chunks to add; and associating each determined physical chunk with each determined logical chunk to add to the logical storage space.

2. The method of claim 1, wherein the logical storage space comprises a logical volume and the physical storage space comprises multiple storage devices, wherein the physical chunks associated with at least two logical chunks in the logical volume are located in separate storage devices.

3. The method of claim 2, wherein each of the multiple storage devices comprises a RAID array and wherein at least two logical chunks in the logical volume are located in separate RAID arrays.

4. The method of claim 3, wherein the physical chunk size is a multiple of a stripe size.

5. The method of claim 4, wherein the physical chunk size is further selected such that a storage space in the RAID array is a multiple of the physical chunk size.

6. A method for mapping logical blocks to physical storage blocks in a storage controller in communication with at least one host system that views a logical storage space, comprising:

defining, with the storage controller, the logical storage space as a sequence of logical chunks, wherein each logical chunk comprises a plurality of logical blocks in the logical storage space;

defining, with the storage controller, a physical storage space as a sequence of physical chunks managed by the storage controller, wherein each physical chunk comprises a plurality of physical storage blocks in the physical storage system; and associating, with the storage controller, each logical chunk in the sequence of logical chunks defining the logical storage space in the at least one host system with one physical chunk in the physical storage system, wherein contiguous logical chunks are capable of being associated with non-contiguous physical chunks, wherein the logical chunk size is selected such that the logical storage space is a multiple of the logical chunk size.

7. The method of claim 6, wherein at least one host system does not include a logical volume manager for mapping logical blocks to physical storage space.

8. The method of claim 6, further comprising:

receiving a command to delete the logical storage space; and removing, with the storage controller, the association of each logical chunk in the deleted logical storage space with each associated physical chunk, wherein each physical chunk for which the association is removed is available to be associated with another logical chunk.

9. A method for mapping logical blocks to physical storage blocks in a storage controller in communication with at least one host system that views a logical storage space, comprising:

defining, with the storage controller, the logical storage space as a sequence of logical chunks, wherein each logical chunk comprises a plurality of logical blocks in the logical storage space;

defining, with the storage controller, a physical storage space as a sequence of physical chunks managed by the storage controller, wherein each physical chunk comprises a plurality of physical storage blocks in the physical storage system;

associating, with the storage controller, each logical chunk in the sequence of logical chunks defining the logical storage space in the at least one host system with one physical chunk in the physical storage system, wherein contiguous logical chunks are capable of being associated with non-contiguous physical chunks;

receiving an input/output (I/O) request with respect to one logical block from one host system;

determining one logical chunk including the requested logical block;

determining the physical chunk associated with the determined logical chunk; and determining the physical storage block within the physical chunk including data for the requested logical block.

10. The method of claim 9, wherein the logical block has a logical block address indicating a location of the logical block within a sequence of logical blocks, wherein the associated physical chunk begins at a beginning physical storage block, wherein determining the logical chunk including the requested logical block comprises determining a quotient of an operation dividing the logical block address by a number of logical block addresses per logical chunk, and wherein determining the physical storage block within the physical chunk comprises determining a physical storage block at an offset equal to a remainder of the operation from the beginning physical storage block.

11. A method for mapping logical blocks to physical storage blocks in a storage controller in communication with at least one host system that views a logical storage space, comprising:

defining, with the storage controller, the logical storage space as a sequence of logical chunks, wherein each logical chunk comprises a plurality of logical blocks in the logical storage space;

defining, with the storage controller, a physical storage space as a sequence of logical chunks managed by the storage controller, wherein each physical chunk comprises a plurality of physical storage blocks in the physical storage system;

associating, with the storage controller, each logical chunk in the sequence of logical chunks defining the logical storage space in the at least one host system with one physical chunk in the physical storage system, wherein contiguous logical chunks are capable of being associated with non-contiguous physical chunks;

generating a logical storage table including one entry for each logical chunk in the logical storage space, wherein each entry includes:
  (i) a logical chunk number indicating a location of the logical chunk for the entry in a sequence of logical chunks defining the logical storage space;
  (ii) a physical chunk number indicating a location of the physical chunk associated with the logical chunk for the entry in the physical storage space; and generating a physical storage table including one entry for each physical chunk in the physical storage space, wherein each entry includes:
  (i) a physical chunk number indicating a location of the physical chunk for the entry in a sequence of physical chunks defining the logical storage space;
  (ii) a logical chunk number indicating a location of the logical chunk associated with the physical chunk for the entry in the logical storage space, wherein associating one physical chunk to one logical chunk comprises indicating in the physical chunk number in the entry for the associated logical chunk in the logical storage table the physical chunk number in the physical storage table of the associated physical chunk and indicating in the logical chunk number in the entry for the physical chunk in the physical storage table the logical chunk number in the logical storage table of the associated logical chunk.

12. The method of claim 11, wherein the physical storage system comprises multiple storage devices, wherein each entry in the logical storage table further includes a device number indicating the storage device including the associated physical chunk, wherein the associated physical chunk is located at a position corresponding to the physical number in the storage device.

13. The method of claim 12, wherein each storage device comprises a RAID array and wherein the device number indicates the RAID array including the associated physical chunk.

14. The method of claim 11, wherein the physical chunk size is selected such that the physical storage and logical storage tables will not exceed a predetermined size.

15. A storage controller system for mapping logical blocks defining a logical storage space to physical storage blocks in a physical storage system, wherein the storage controller is in communication with at least one host system that views a logical storage space, comprising:
  means for defining the logical storage space as a sequence of logical chunks, wherein each logical chunk comprises a plurality of logical blocks in the logical storage space;
  means for defining a physical storage space as a sequence of physical chunks, wherein each physical chunk comprises a plurality of physical storage blocks in the physical storage system;
  means for associating each logical clunk in the sequence of logical chunks defining the logical storage space with one physical chunk in the physical storage system, wherein contiguous logical chunks are capable of being associated with non-contiguous physical chunks;
  means for determining a number of logical chunks to add to the logical storage space to expand storage in the logical storage space;
  means for determining one physical chunk not associated with a logical chunk in the physical storage space for each detained logical chunks to add; and
  means for associating each determined physical chunk with each determined logical chunk to add to the logical storage space.

16. The storage controller system of claim 15, wherein the logical storage space comprises a logical volume in a host system and the physical storage system comprises multiple storage devices, wherein the physical chunks associated with at least two logical chunks in the logical volume are located in separate storage devices.

17. The storage controller system of claim 16, wherein each of the multiple storage devices comprises a RAID array and wherein at least two logical chunks in the logical volume are located in separate RAID arrays.

18. The storage controller system of claim 17, wherein the physical chunk size is a multiple of a stripe size.

19. The storage controller system of claim 18, wherein the physical chunk size is further selected such that a storage space in the RAID array is an integer multiple of the physical chunk size.

20. A storage controller system for mapping logical blocks defining a logical storage space to physical storage blocks in a physical storage system, wherein the storage controller is in communication with at least one host system that views a logical storage space, comprising:
  means for defining the logical storage space as a sequence of logical chunks, wherein each logical chunk comprises a plurality of logical blocks in the logical storage space;
  means for defining a physical storage space as a sequence of physical chunks, wherein each physical chunk comprises a plurality of physical storage blocks in the physical storage system;
  means for associating each logical chunk in the sequence of logical chunks defining the logical storage space with one physical chunk in the physical storage system, wherein contiguous logical chunks are capable of being associated with non-contiguous physical chunks;
  means for receiving an input/output (I/O) request with respect to one logical block;
  means for determining one logical chunk including the requested logical block;
  means for determining the physical chunk associated with the determined logical chunk; and
  means for determining the physical storage block within the physical chunk including data for the requested logical block.

21. The storage controller system of claim 20, wherein the logical storage space is implemented in a host system in communication with a storage controller that controls access to the physical storage system, wherein the storage controller includes the means for defining the logical and physical chunks and associating logical with physical chunks.

22. The storage controller system of claim 20, wherein the logical chunk size is selected such that the logical storage space is an integer multiple of the logical chunk size.

23. The storage controller system of claim 20 further comprising:
  means for deleting the logical storage space; and
  means for removing the association of each logical chunk in the deleted logical storage space with each associated physical chunk, wherein each physical chunk for which the association is removed is available to be associated with another logical chunk.

24. The system of claim 20, wherein the logical block has a logical block address indicating a location of the logical block within a sequence of logical blocks, wherein the associated physical chunk begins at a beginning physical storage block, wherein the means for determining the logical chunk including the requested logical block comprises determining a quotient of an operation dividing the logical block address by a number of logical block addresses per logical chunk, and wherein determining the physical storage block within the physical chunk comprises means for determining a physical storage block at an offset equal to a remainder of the operation from the beginning physical storage block.

25. An article of manufacture for mapping logical blocks to physical storage blocks, wherein at least one host system views a logical storage spaces the article of manufacture comprising computer readable storage media including at least one computer program embedded therein that is capable of causing a storage controller to perform;
  defining the logical storage space as a sequence of logical chunks, wherein each logical chunk comprises a plurality of logical blocks in the logical storage space;
  defining a physical storage space as a sequence of physical chunks, wherein each logical chunk comprises a plurality of physical storage blocks in the physical storage system;
  associating each logical chunk in the sequence of logical chunks defining the logical storage space with one physical chunk in the physical storage system wherein contiguous logical chunks are capable of being associated with non-contiguous physical chunks;
  determining a number of logical chunks to add to the logical storage space to expand storage in the logical storage space;
  determining one physical chunk not associated with a logical chunk in the physical storage space for each determined logical chunks to add; and
  associating each determined physical chunk with each determined logical chunk to add to the logical storage space.

26. An article of manufacture for mapping logical blocks to physical storage blocks, wherein at least one host system views a logical volume, the article of manufacture comprising computer readable storage media including at least one computer program embedded therein that is capable of causing a storage controller to perform;
  defining the logical volume as a sequence of logical chunks wherein each logical chunk comprises a plurality of logical blocks in the logical volume,
  defining multiple RAID arrays as a sequence of physical chunks, wherein each physical chunk comprises a plurality of physical storage blocks in the RAID arrays;
  associating each logical chunk in the sequence of logical chunks defining the logical volume with one physical chunk in the RAID arrays, wherein contiguous logical chunks are capable of being associated with non-contiguous physical chunks, and wherein at least two logical chunks in the logical volume are located in separate RAID arrays.

27. The article of manufacture of claim 26, wherein the physical chunk size is a multiple of a stripe size.

28. The article of manufacture of claim, 27, wherein the physical chunk size is further selected such that a storage space in the RAID array is a multiple of the physical chunk size.

29. An article of manufacture for mapping logical blocks to physical storage blocks, wherein at least one host system views a logical volume, the article of manufacture comprising computer readable storage media including at least one computer program embedded therein that is capable of causing a storage controller to perform:
  defining the logical volume as a sequence of logical chunks, wherein each logical chunk comprises a plurality of logical blocks in the logical volume;
  defining multiple RAID arrays as a sequence of physical chunks, wherein each physical chunk comprises a plurality of physical storage blocks in the RAID arrays;
  associating each logical chunk in the sequence of logical chunks defining the logical volume with one physical chunk in the RAID arrays, wherein contiguous logical chunks are capable of being associated with non-contiguous physical chunks, wherein the logical chunk size is selected such that the logical storage space is a multiple of the logical chunk size.

30. The article of manufacture of claim 29, wherein the logical storage space comprises a logical volume and the physical storage system comprises multiple storage devices, wherein the physical chunks associated with at least two logical chunks in the logical volume are located it separate storage devices.

31. The article of manufacture of claim 29, further causing the storage controller to perform:
  deleting the logical storage space; and
  removing the association of each logical chunk in the deleted logical storage space with each associated physical chunk, wherein each physical chunk for which the association is removed is available to be associated with another logical chunk.

32. An article of manufacture for mapping logical blocks to physical storage blocks, wherein at least one host system views a logical volume, the article of manufacture comprising computer readable storage media including at least one computer program embedded therein that is capable of causing a storage controller to perform:
  defining the logical volume as a sequence of logical chunks, wherein each logical chunk comprises a plurality of logical blocks in the logical volume;
  defining multiple RAID arrays as a sequence of physical chunks, wherein each physical chunk comprises a plurality of physical storage blocks in the RAID arrays;
  associating each logical chunk in the sequence of logical chunks defining the logical volume with one physical chunk in the RAID arrays, wherein contiguous logical chunk are capable of being associated with non-continuous physical chunks;
  receiving an input/output (I/O) request with respect to one logical block;
  determining one logical chunk including the requested logical block;
  determining the physical chunk associated with the determined logical chunk; and
  determining the physical storage block within the physical chunk including data for the requested logical block.

33. The article of manufacture of claim 32, wherein the logical block has a logical block address indicating a location of the logical block within a sequence of logical blocks, wherein the associated physical chunk begins at a beginning physical storage block, wherein determining the logical chunk including the requested logical block comprises determining a quotient of an operation dividing the logical block address by a number of logical block addresses per logical chunk, and wherein determining the physical storage block within the physical chunk comprises determining a physical storage block at an offset equal to a remainder of the operation from the beginning physical storage block.

34. An article of manufacture for mapping logical blocks to physical storage blocks, wherein at least one host system views a logical volume, the article of manufacture comprising computer readable storage media including at least one computer program embedded therein that is capable of causing a storage controller to perform:
  defining the logical volume as a sequence of logical chunks, wherein each logical chunk comprises a plurality of logical blocks in the logical volume;
  defining multiple RAID arrays as a sequence of physical chunks, wherein each physical chunk comprises a plurality of physical storage blocks in the RAID arrays;
  associating each logical chunk in the sequence of logical chunks defining the logical volume with one physical chunk in the RAID arrays, wherein contiguous logical chunks are capable of being associated with non-contiguous physical chunks;
  generating a logical storage table including one entry for each logical chunk in the logical storage space, wherein each entry includes:
    (i) a logical chunk number indicating a location of the logical chunk for the entry in a sequence of logical chunks defining the logical storage space;
    (ii) a physical chunk number indicating a location of the physical chunk associated with the logical chunk for the entry in the physical storage space; and
  generating a physical storage table including one entry for each physical chunk in the physical storage space, wherein each entry includes:
    (i) a physical chunk number indicating a location of the physical chunk for the entry in a sequence of physical chunks defining the logical storage space;
    (ii) a logical chunk number indicating a location of the logical chunk associated with the physical chunk for the entry in the logical storage space, wherein associating one physical chunk to one logical chunk comprises indicating in the physical chunk number in the entry for the associated logical chunk in the logical storage table the physical chunk number in the physical storage table of the associated physical chunk and indicating in the logical chunk number in the entry for the physical chunk in the physical storage table the logical chunk number in the logical storage table of the associated logical chunk.

35. The article of manufacture of claim 34, wherein the physical storage system comprises multiple storage devices, wherein each entry in the logical storage table further includes a device number indicating the storage device including the associated physical chunk, wherein the associated physical chunk is located at a position corresponding to the physical number in the storage device.

36. The article of manufacture of claim 35, wherein each storage device comprises a RAID array and wherein the device number indicates the RAID array including the associated physical chunk.

37. The article of manufacture of claim 34, wherein the physical chunk size is selected such that the physical storage and logical storage tables will not exceed a predetermined size.

38. A computer useable data transmission medium including data structures for use by a storage controller for mapping logical blocks to physical storage blocks, comprising:
  information on a sequence of logical chunks, wherein each logical chunk defines a plurality of contiguous logical blocks in a logical storage space;
  information on a sequence of physical chunks that define a plurality of contiguous physical storage blocks in a RAID array;
  information on an association of logical chunks to physical chunks, wherein each logical chunk in the sequence of logical chunks defining the logical storage space is associated with one physical chunk in the RAID array, and wherein contiguous logical chunks are capable of being associated with non-contiguous physical chunks, wherein at least two logical chunks in the logical volume are located in separate RAID arrays.

39. A computer useable data transmission medium including data structures for use by a storage controller for mapping logical blocks to physical storage blocks, comprising:
  information on a sequence of logical chunks, wherein each logical chunk defines a plurality of contiguous logical blocks in a logical storage space;
  information on a sequencing of physical chunks that define a plurality of contiguous physical storage blocks in a physical storage system;
  information on an association of logical chunks to physical chunks, wherein each logical chunk in the sequence of logical chunks defining the logical storage space is associated with one physical chunk in the physical storage system, and wherein contiguous logical chunks are capable of being associated with non-contiguous physical chunks, wherein the physical chunk size is a multiple of a stripe size.

40. The computer useable transmission medium of claim 39, wherein the physical chunk size is further selected such that a storage space in the RAID array is a multiple of the physical chunk size.

41. A computer useable data transmission medium including data structures for use by a storage controller for mapping logical blocks to physical storage blocks, comprising:
  information on a sequence of logical chunks wherein each logical chunk defines a plurality of contiguous logical blocks in a logical storage space;
  information on a sequence of physical chunks that define a plurality of contiguous physical storage blocks in a physical storage system;
  information on an association of logical chunks to physical chunks, wherein each logical chunk in the sequence of logical chunks defining the logical storage space is associated with one physical chunk in the physical storage system, and wherein contiguous logical chunks are capable of being associated with non-contiguous physical chunks, wherein the logical chunk size is selected such that the logical storage space is a multiple of the logical chunk size.

42. The computer useable transmission medium of claim 41, wherein the physical storage system comprises multiple storage devices, wherein each entry in the logical storage table further includes a device number indicating the storage device including the associated physical chunk, wherein the associated physical chunk is located at a position corresponding to the physical number in the storage device.

43. The computer useable transmission medium of claim 42, wherein each storage device comprises a RAID array and wherein the device number indicates the RAID array including the associated physical chunk.

* * * * *